Sept. 27, 1966     D. L. GRULLER     3,275,032
VALVE
Filed April 30, 1964     2 Sheets-Sheet 1
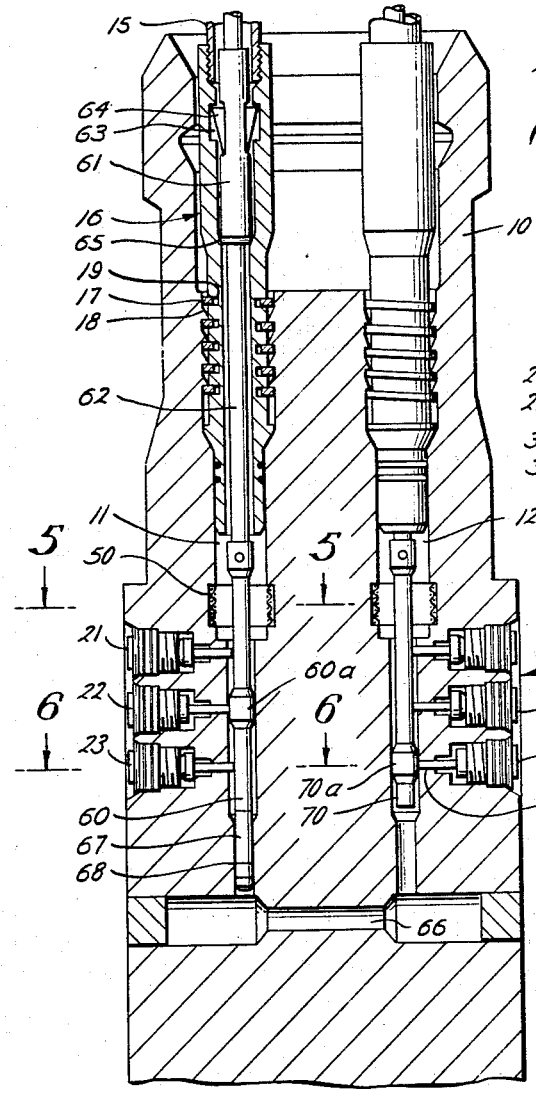
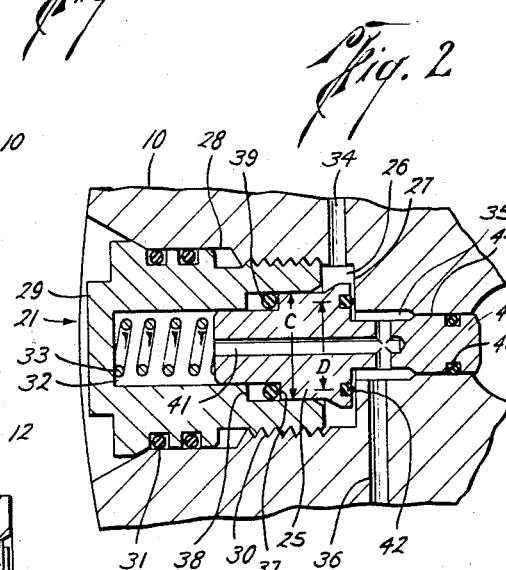
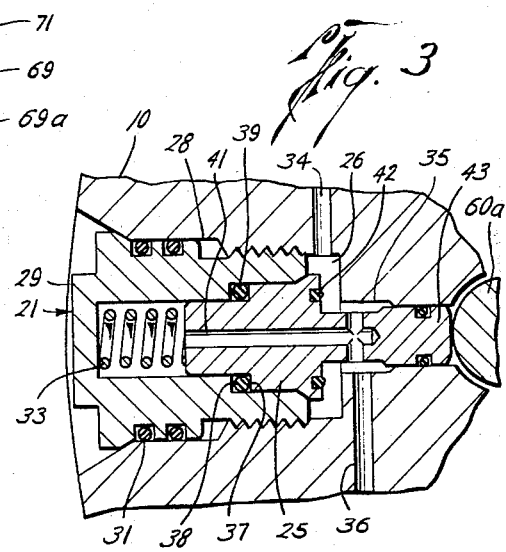
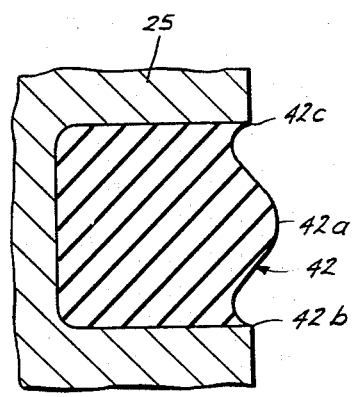
David L. Gruller
INVENTOR.
BY
Browning, Simms, Hyer & Eckerroldt
ATTORNEYS

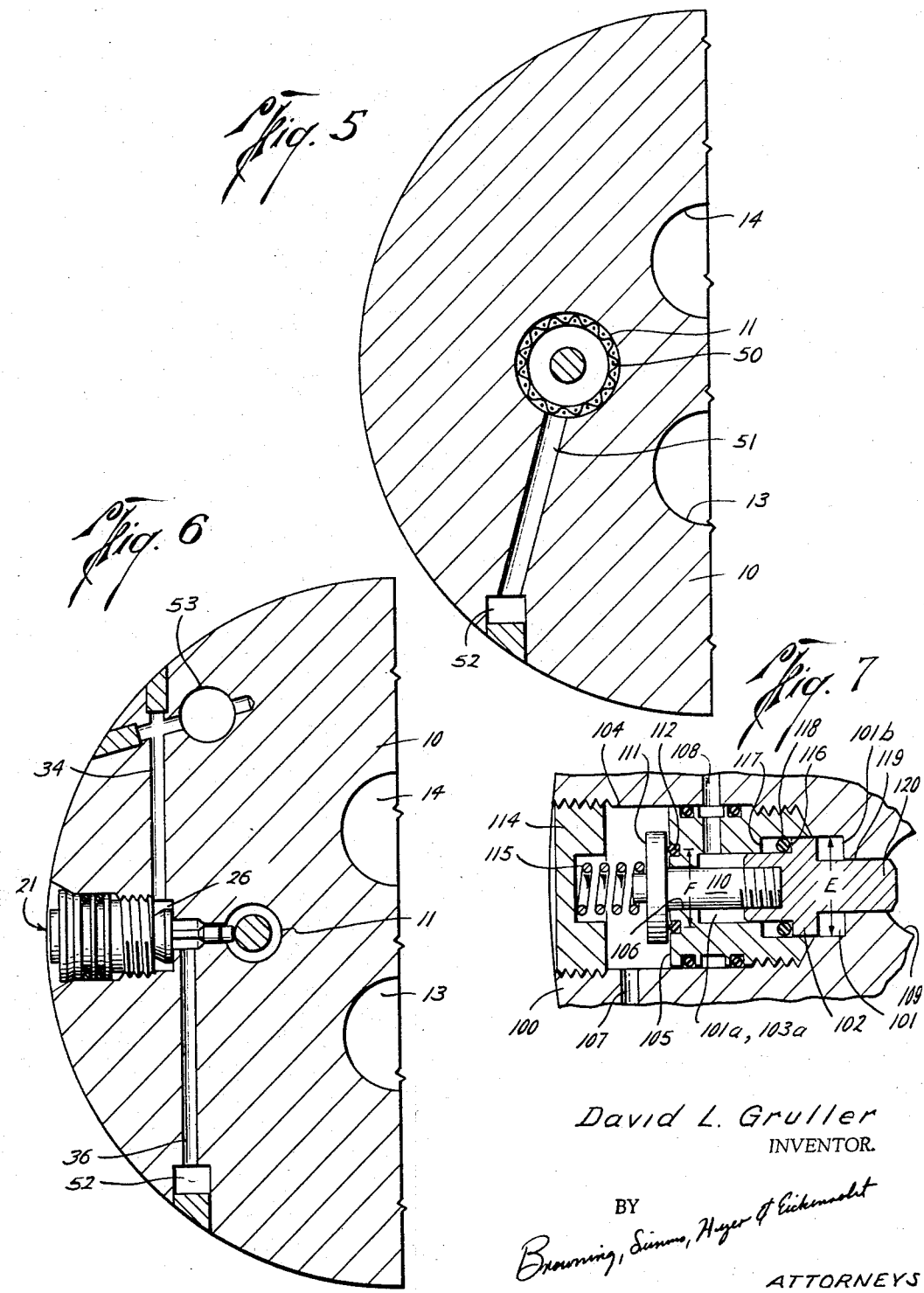

United States Patent Office 3,275,032
Patented Sept. 27, 1966

3,275,032
VALVE
David L. Gruller, Houston, Tex., assignor to
Cameron Iron Works, Inc., Houston, Tex.
Filed Apr. 30, 1964, Ser. No. 363,732
8 Claims. (Cl. 137—608)

This invention relates to valves generally and more particularly to poppet type valves which are held closed by resilient means.

Valves, of the type to which this invention relates, are useful in controlling the flow through any conduit, but they have particular utility when empolyed in a manifold to control the flow through a plurality of individual conduits which are connected to a common conduit. For example, one method commonly used to complete underwater wells, is to connect the Christmas tree to a well head by a pressure actuated latch which can be actuated remotely by applying pressure from the surface of the water. Usually there are additional devices connected to the Christmas tree or well head such as the tubing hanger, flow control valves, etc., which desirably are also actuated by fluid pressure applied from the surface. It is preferable, of course, to have only one pressure conduit from the surface to the well head through which pressure is supplied to actuate these various devices. Therefore, there is a need for a manifold, having a common conduit from which pressure can be separately applied to any of a plurality of pressure actuated devices. However, in such a manifold, whenever fluid under pressure is supplied to the common conduit to actuate one of the devices connected thereto, the pressure of the fluid will be exerted on one side of all of the valves of the manifold. Thus, for such a manifold to provide the control desired, the valves, used to control the flow of pressure fluid to the other devices connected to the manifold, should be arranged so they will not be opened by the pressure of the fluid in the common conduit. Further, in many applications it is desirable to hold pressure in the conduit connecting the pressure actuated devices to the common conduit after they have been actuated. Thus, preferably, the valves used should be able to remain closed and hold pressure in the conduit in which they are installed even though the pressure in the common conduit is released. Thus, there is a need for a valve which can be selectively opened when desired, and which will, when closed, prevent the flow of fluid in either direction through the passageway in which it is installed, regardless of the direction that the diffeerntial pressure exists across the valve. It is an object of this invention to provide such a valve.

It is another object of this invention to provide a valve of the poppet type which will remain closed regardless of the direction that the differential pressure exists across the valve, but which can be easily opened when desired.

It is another object of this invention to provide a poppet type valve which is resiliently held in engagement with its valve seat and which will remain in sealing engagement with the valve seat regardless of the direction that the differential pressure exists across the valve.

It is another object of this invention to provide a poppet type valve which is resiliently held in engagament with its seat which can be opened to allow pressure fluid to flow through the valve to a pressure actuated device and which, when closed, will hold the pressure applied to the device and prevent it from escaping back through the conduit after the valve is closed even though the pressure in the manifold is again raised above that being held in the conduit by the valve.

Other objects, advantages and features of this invention will be apparent to one skilled in the art from consideration of this specification, the attached drawings and appended claims.

These objects are obtained in accordance with this invention by providing a valve having a valve member, movable into and out of sealing engagement with a valve seat, which has a pressure face against which either the upstream or downstream pressure can exert a force, depending upon which is greater, urging the valve member toward the seat. Then by providing this pressure face with an area equal to or greater than the effective area of the valve against which either the upstream or downstream pressures act to open the valve, the forces exerted on the valve member tending to open the valve will be either equal to or less than the force exerted on the pressure face urging the valve closed. With this arrangement, when the valve is closed, it cannot be opened by pressure regardless of the direction in which it is applied.

"Effective area" as used above and throughout this specification means that area on the valve member against which either the upstream and downstream pressure acts to urge the valve member away from the seat. Total "effective area" then is the sum of the two effective areas, except where these pressures act over the same effective area in which case the total effective area of the valve is equal to the effecive area against which either pressure acts.

The invention will now be described in detail in connection with the embodiment thereof shown in the attached drawings, in which:

FIGURE 1 is a vertical cross sectional view of a manifold provided with poppet valves constructed in accordance with this invention;

FIGURE 2 is a partial cross sectional view taken through one of the poppet valves of the manifold shown in FIGURE 1, showing the valve in the closed position;

FIGURE 3 is a view similar to FIGURE 2 showing the poppet valve in the open position;

FIGURE 4 is a cross sectional view of an improved seal ring for use with the poppet valve of this invention;

FIG. 5 is a horizontal sectional view taken along line 5—5 of FIG. 1 showing the arrangement whereby the fluid supplied to the pressure actuated devices is screened before passing from the manifold through the valves;

FIG. 6 is a view taken along line 6—6 of FIG. 1 showing the particular arrangement of passageways in the manifold assembly of FIG. 1 whereby fluid is conducted to and from the valves; and FIG. 7 is a sectional view through an alternate embodiment of the invention.

As explained above, the valve of this invention is of particular utility when incorporated in a manifold employed to provide pressure fluid to pressure actuated devices used in the completion of an underwater oil well. FIG. 1 illustrates a typical manifold arrangement for accomplishing this. It consists of a body 10 provided with four vertical, generally parallel, openings 11, 12, 13 and 14. Openings 11 and 12 are employed as manifolds, whereas openings 13 and 14 are generally extensions of the tubing strings employed in the completion of underwater oil wells. Here two such openings are shown as this is the number commonly provided. These openings are generally adapted to be connected to flow lines extending from the well.

In the embodiment shown in FIG. 1 two manifolds, generally indicated by the letters A and B, are provided so that one can serve as a return line for the other. In other words, in most cases, the device being actuated employs a piston which is moved from one position to another by pressure fluid exerted on one side of it. This means that the fluid which happens to be on the other side of the piston must be displaced to allow the piston to move freely in the desired direction, otherwise, a pressure lock would exist. Therefore, an exhaust should be provided for the fluid on the side of the piston opposite that which the pressure is being applied. Also, most of these devices are actuated by moving the piston in one direction and are released by moving the piston in the other direction. Therefore, by arranging two manifolds such as those shown whereby one is connected to one side of the actuating piston of the device and the other is connected to the other side of the piston, the device can be actuated and released depending on which manifold is supplied with the pressure fluid.

Since both manifolds A and B are structurally identical, only one, manifold A, will be described in detail. To provide opening 11, which is the common conduit or pressure chamber of manifold A, with pressure fluid, pressure line 15, which extends to the surface, is connected thereto by connector 16. The connector is threadedly engaged to pressure line 15 and provided with a spiral spring 17 adapted to latch into engagement with helical teeth 18 formed in body 10 adjacent the upper end of opening 11. As can be seen from the drawings, the upper edge of teeth 18 are beveled to cam the spring inwardly in grooves 19 provided therefor in connector 16 to allow the spring to ratchet into engagement with the teeth. This is the well known latch-in type thread connection. Pressure seals 20 are provided to seal between the connector and body 10 to prevent the flow of fluid into or out of opening 11 along the outside of the connector.

A plurality of valves are provided to control the flow of pressure fluid from the common conduit 11, of the manifold opening to the individual pressure actuated devices (not shown) connected to the manifold.

In the embodiment illustrated three such valves are shown, being designated 21, 22, and 23 respectively. These valves are structurally identical, therefore, only one, valve 22, will be described in detail.

As shown in FIGS. 2 and 3, the valve consists of valve member 25, reciprocally mounted in cavity 26 provided in body 10 for movement into and out of sealing engagement with valve seat 27. For ease in assembling the valve in the body, cavity 26 is provided by closing laterally extending opening 28 in body 10, by plug member 29. Opening 28 and plug member 29 are provided with interengaging threads 30 to removably hold the plug in position in the opening. Seal rings 31 are provided to seal between the plug and the opening to maintain the pressure fluid in cavity 26.

Plug 29 is provided with a flat bottom, blind hole 32 into which valve member 25 extends. Thus the walls of hole 32 serve to guide the valve member as it reciprocates into and out of engagement with valve seat 27. Coil spring 33 is located between the end of valve member 25 and the bottom of hole 32 to provide a resilient force constantly urging the valve member into sealing engagement.

Connected into cavity 26 is passageway 34, which in the embodiment illustrated is connected to the pressure device being actuated. Valve seat 27, in turn, is provided with a port 35, which is connected to passageway 36, which in this embodiment is connected to the common conduit of the manifold, opening 11. Thus, when valve member 25 is moved out of engagement with valve seat 27 fluid can freely flow through cavity 26 between the passageways 34 and 36.

As explained above, in accordance with this invention a spring loaded poppet type valve is provided which, when closed, is unaffected by pressure acting against it. In other words, in accordance with this invention, when valve member 25 is in engagement with valve seat 27 it will not be moved out of engagement by pressure exerted thereon, regardless of the relationship of the upstream or downstream pressures. To accomplish this, a pressure face is provided on the valve member against which either upstream or downstream pressure will act urging the valve member closed depending upon which is the higher pressure. In the embodiment illustrated this is accomplished by providing valve member 25 with a portion of increased diameter intermediate its ends to provide shoulder or pressure face 37. Hole 32, in turn, is provided with a portion of increased diameter to provide an oppositely facing shoulder 38. Located between pressure face 37 and shoulder 38 is seal ring 39 which is free to move into engagement with either shoulder depending upon the direction the pressure differential exists across the seal. Since passageway 34 is connected into cavity 26 any pressures which exist in this passageway will exert a force on seal 39 tending to urge it toward shoulder 38. To allow the pressure in passageway 36 to exert itself against pressure face 37 when it is higher than the pressure in passageway 34, means are provided to connect passageway 36 with hole 32 on the side of seal member 39 opposite that of passageway 34. In the embodiment illustrated opening 41 extends through valve member 25 and connects valve port 35 to hole 32 on the opposite side of seal member 39 from passageway 34.

To illustrate how this arrangement allows the higher pressure in either conduit 34 or 36, to exert a force on pressure face 37 urging the valve closed, assume that the pressure in passageway 36 is greater than that in passageway 34 and that the valve is closed. The pressure differential across seal member 39 then, will be such that it will be moved into engagement with pressure face 37 allowing the full effect of the pressure in passageway to be applied to pressure face 37 through the seal itself. Thus, the pressure in passageway 36 will exert a force on the pressure face tending to hold the valve closed.

By arranging the area of pressure face 37 so that it is equal to the total effective area of the valve element, which, as explained above, is the area against which the pressure in passageway 34 and 36 both act to urge the valve member away from its seat, the forces exerted on the valve member will either be balanced or they will be unbalanced in the direction of urging the valve closed. For example, valve member 25 is provided with a resilient seal ring 42 which encompasses an area of diameter D on valve seat 27. This is the effective area against which the pressure in passageway 36 exerts a force tending to move the valve member out of engagement with the valve seat. Conversely the effective area against which the pressure in passageway 34 acts to urge the valve member out of engagement with the valve seat is the difference between the area of diameter C and the area of diameter D. Thus, in this embodiment whenever a differential pressure exists across the valve the balance of forces will be such that the force exerted by this differential pressure on the area of diameter C will be only partially balanced since the pressure will be acting on one or the other of the effective areas, either of which is smaller than the area of the pressure face, resulting in an unbalanced force urging the valve closed.

To open the valve, means are provided to engage the valve member and move it away from the valve seat. In the embodiment illustrated, valve stem 43 is integrally connected to valve member 25 and extends through valve port 35 and lateral opening 44 into opening 11, the common conduit of the manifold. The valve stem is provided with a seal 45 to prevent fluid from flowing from the common conduit directly to the valve portion for reasons which will be explained below. With this arrangement the valve can be opened by applying a lateral force to valve stem 43 causing the valve member to move out of engagement with the valve seat in the manner shown in FIG. 3.

To insure that no debris, particles of dirt, etc., enter the valves of the manifold, it is desirable to screen the hydraulic fluid upstream of the valve. In the embodiment illustrated, filter screen 50 is provided for this purpose. As shown in FIGS. 5 and 6, body 10 is provided with a lateral opening 51 which interconnects opening 11, adjacent screen 50, with a vertical passageway 52, which extends downwardly along side the valves of the manifold and provides a common header to which each valve is connected. For example, valve 23 is connected to header 52 by passageway 80 as shown in FIG. 6. In this manner, all pressure fluid is passed through screen 50 before reaching any of the valves of the manifold. For this reason, the valve stems are provided with seals, in the manner that valve stem 43 is provided with seal 45, to prevent fluid from flowing directly to the valves through the lateral openings in which the valve stems are located.

Since the valve stem is provided with a seal it could act as a piston across which a differential pressure could exist, if, for example, the location of the passageways leading to the valve were reversed. For this reason, preferably the passageway connected to valve bore 35, which in this case is passageway 36, is connected directly to the common conduit 11 of manifold so that no pressure differential exists across seal 45. There will, of course, be a pressure drop from the common conduit to the valve as fluid flows through these passages to and from the valve so that when the valve is open and flow is occurring there will be a pressure differential across seal 45. However, at this point of the operation the valve is being positively held open and this pressure differential will have no effect on the operation of the valve.

Passageway 81, which is downstream of valve 23 leads from cavity 26 of the valve body to a vertical opening 53 as shown in FIG. 6 which is in turn connected to one of the pressure actuated devices (not shown) to be operated by the manifold.

In the embodiment illustrated, the valves of the manifold are selectively opened by dart members which extend through the common conduit of the manifold and which are provided with cam means located to engage the valve stem of one or more valves and move it laterally opening the valve. Thus, as shown in FIG. 1, dart 60 is located in common conduit 11 of manifold A and is provided with cam means comprising enlarged section 60a which is positioned to engage valve stem 43 of valve 22 and open it. FIG. 3 is an enlarged view of valve 22 showing cam 60a in position holding the valves open.

These valve opening members or darts are generally run on a wire line so they can be quickly installed and removed from the manifold through pressure line 15. In the embodiment illustrated, the dart assembly includes dart 60, hold down latch 61, and spacer 62. The bore of connector 16 is provided with a groove 63 to receive latch dogs 64 carried by the hold down latch. This latch is of conventional design and any of several different types could be used to hold dart 60 into position during the pressure operation. Connector 16 is also provided wtih an inner shoulder 65 which engages the lower end of latch 61 and limits the downward travel of the latch and the dart. Since in the embodiment illustrated, manifold A and manifold B are interconnected by lateral passageway 66, to allow circulation between openings 11 and 12 for washing purposes, the lower end of one of the darts is usually provided with a stinger, such as stinger 67, which has seal rings 68 thereon, and which extends into the lower end of opening 11 and prevents the flow of fluid through lateral opening 66.

As explained above, when it is desired to open a valve, for example, valve 22 of manifold A, a dart arranged such as the one shown in FIG. 1 is inserted into the common conduit of the manifold. When it is desired to open another valve in the same manifold, such as valve 23, then dart assembly 70 is removed and another dart assembly is lowered into position, the latter having a valve opening cam section properly located to open valve 23. This dart would be shaped similar to dart 70 shown opening valve 69 in manifold B, which has enlarged portion 70a positioned to engage valve stem 69a of valve 69 and move it laterally opening the valve.

Usually, of course, to reduce the chances of error, the same positioned valves in each manifold will be connected to the same pressure device so that identical darts will be used in each manifold to operate each particular device. Thus, usually when the device connected to valve 22 is to be operated, its return and/or release line will be connected to conduit 12 through valve 71 so that a dart having its valve opening cam section located in the same position as dart 60 will be inserted in manifold B.

FIG. 4 illustrates the preferred cross sectional shape of the resilient seal ring 42 which is carried by valve member 25 to sealingly engage valve seat 27. The seal ring is designed so that the portion 42a which is intermediate its inner and outer edges 42b and 42c respectively, protrudes beyond the plane of the end surface of valve member 25 as shown by the dotted line in FIG. 4. In this way the protruding portion 42a of the seal ring will initially engage the valve seat and provide an initial seal before valve member 25 has traveled all the way into engagement with the valve seat. Further, this initial seal is obtained over a relatively small area so that the unit force in the resilient material of the seal ring, which is usually rubber, either natural or synthetic, is higher than it would be if the entire cross area of the seal ring made the initial contact, thereby helping to establish the initial seal. Since the portion 42a of the seal protrudes beyond the plane of the end of the valve member, portions on either side thereof are relieved to avoid having an excessive amount of unsupported resilient material between the valve member and the valve seat.

FIG. 7 illustrates an alternate embodiment of the invention. This embodiment is also shown installed in a manifold to control the flow of fluid from a common conduit through an individual conduit. Also, here, as in the embodiment described above, body 100, which houses the manifold also provides the body for the valves. Thus, body 100 is provided with a cavity 101 within which is reciprocally mounted valve 102. For ease of assembly, cavity 101 is formed from a portion of lateral opening 104 in body 100 and bore 103a of plug member 103. Plug 103 is threadedly connected into opening 104 and also provides valve seat 105 and valve seat bore 106 which interconnects passageways 107 and 108. These passageways combine to lead pressure fluid from the common conduit 109 of the manifold to the particular pressure actuated device, the operation of which is controlled by this valve.

In the embodiment illustrated, passageway 107 connects the valve to common conduit 109 whereas passageway 108 connects the valve to the pressure actuated device (not shown). Threadedly connected to valve member 102 is valve stem 110 which extends through valve seat bore 106 and is attached to valve element 111. Thus, reciprocal movement of valve member 102 in the cavity will move valve element 111 into and out of engagement with valve seat 105. The valve seat is also provided with a seal ring 112, similar to seal ring 42, described in connection with the embodiment above, to provide the seal between the valve element and the valve seat. Spring cap member 114 seals the valve within opening 104 in the body and also provides a stop for coil spring 115, which is located between the cap and the valve element 111, to provide resilient means urging the valve element toward the seat.

Here, as in the embodiment above, the valve e'ement is provided with a pressure face against which the higher of either upstream or downstream pressure can exert a force urging the valve closed. Thus, valve element 102 is provided with a portion of reduced diameter to provide a pressure face or shoulder 116 and the bore of plug 103 is provided with a portion of reduced diameter to provide an oppositely facing shoulder 117. Seal member 118 is located between these shoulders to move into engagement with either one or the other depending upon the direction of differential pressure across the seal.

The seal divides cavity 101 into two sections. The first section 101a is connected to passageway 108 and the second second 101b is connected to passageway 107. In this embodiment, since the pressure in passageway 107 and the common conduit 109 is the same when valve is closed, section 101b of cavity 101 is connected directly to conduit 109 by providing an opening 119 through body 100 between the cavity and the conduit. Thus, here, as in the embodiment described above, when the pressure in passageway 108 is greater than the pressure in passageway 107, pressure seal 118 will move into engagement with pressure face 116 and the pressure in passageway 108 will exert a force on the valve member tending to close the valve. Conversely, when the pressure differential is reversed across seal member 118, it will move into engagement with shoulder 117, thereby continuing to isolate the two portions of the cavity, however, allowing the pressure in passageway 107 and conduit 109 to exert a force on pressure face 116 tending to close the valve. Here, again, the area of the pressure face is equal to the total effective area of the valve against which upstream and downstream pressure act. In this embodiment, valve seat seal member 112 encompasses an area of diameter F on valve element 111. This is the effective area of the valve against which downstream pressure acts tending to open the valve. By arranging diameter E greater than F, of course, an unbalanced force will be produced by the downstream pressure tending to hold the valve closed. When upstream pressure is the highest its acts over the area of diameter E urging the valve open, therefore, the area of presure face 116 should be sufficient, when combined with the area of diameter F, to provide a total area against which upstream pressure acts which is equal to or greater than the area of diameter E. With this arrangement when the valve is closed, it will not be opened by the pressure acting on it. Means are provided to move the valve member away from the seat when desired. In this embodiment, plunger 120 is attached to valve member 102 and extends through opening 119 into conduit 109. Thus, the valve can be opened by running a dart, similar to the darts described above, into conduit 109 and locating the valve opening cam portion of the dart to move plunger 120 laterally thereby forcing the valve element 111 away from seat 105.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A manifold comprising a common conduit and a plurality of individual conduits connected to the common conduit to allow fluid to flow from one conduit to the other through the common conduit, and valve means located in each individual conduit for controlling the flow of fluid between each individual conduit and the common conduit, said valve means comprising a valve body having a cavity therein, the cavity being located so all of the fluid flowing through the individual conduit flows through the cavity thereby dividing the conduit into first and second portions connected by the cavity, a valve seat supported by the body and a valve member movably mounted in the body for movement into and out of sealing engagement with the valve seat to control the flow of fluid through the cavity, a seal member for sealing between the valve member and the cavity to isolate a portion of the cavity from the second portion of the conduit, a passageway connecting the isolated portion of the cavity with the first portion of the conduit; a pressure face on the valve element located to allow the seal member to move into and out of engagement therewith depending upon which portion of the conduit contains the higher pressure so the higher pressure will always exert a force on the pressure face, urging the valve element toward the valve seat, the area of the pressure face being equal to the effective area of the valve member against which pressure in the two portions of the individual conduit acts urging the valve member away from the valve seat; means for moving the valve element out of engagement with the valve seat to allow fluid to flow through the conduit and resilient means urging the valve member into sealing engagement with the valve seat.

2. The manifold of claim 1 in which each valve is provided with a valve stem which extends into the common conduit.

3. The manifold of claim 2 further provided with valve opening means movable into the common conduit to selectively open one or more valves.

4. A valved manifold for controlling the flow of fluid between a plurality of conduits comprising, a body having a pressure chamber therein adapted to be connected to a fluid conduit and a plurality of passageways connecting the pressure chamber to the exterior of the body to provide a plurality of conduits through which fluid can flow out of and into the pressure chamber; valve means for controlling the flow of fluid through each passageway, said valve means comprising, a valve member reciprocally mounted in a cavity in the manifold body, the cavity being arranged to form a portion of the passageway, and to divide the passageway into a first portion between the pressure chamber and the cavity and a second portion between the cavity and the exterior of the body; a valve seat having a port which connects the first portion of the passageway to the cavity, the valve member being movable into and out of sealing engagement with the seat to control the flow of fluid through the passageway, and resilient means urging the valve member into sealing engagement with the valve seat, a seal member arranged to sealingly engage the valve member and the cavity, and a pressure face located between the seal member and one of the portions of the passageway to allow the pressure in said portion to exert its pressure directly on the seal face and urge the valve member toward the valve seat when the pressure therein is higher than the pressure in the other portion and to allow the seal member to move into engagement with the seal face when the pressure in the portion of the passageway on the other side of the seal member from the sealing face is higher than that in the other portion, to allow the higher pressure therein to exert a force on the pressure face through the seal member, urging the valve member closed; the area of the pressure face being equal to the total effective area of the valve member against which the pressure in the passageway acts urging the valve member away from the valve seat; and means for moving the valve member away from the valve seat to open the valve.

5. The manifold of claim 4 in which each valve is provided with a valve stem for engaging the valve member and moving it away from the valve seat to open the valve, and a valve opening member, located in the pressure chamber, and movable into and out of engagement with the valve stems to selectively open the valves.

6. The manifold of claim 5 in which the valve member is provided with an opening connecting the first portion of the passageway with the cavity on the opposite side of the seal member from the second portion of the passageway.

7. A valve comprising, a body having first and second fluid conduits and a cavity connected to the second conduit, a valve seat mounted in the body having a port therethrough connecting the cavity with the first conduit, a valve member reciprocally mounted in the cavity for movement into and out of sealing engagement with the valve seat, a passageway connecting the cavity to the first conduit, a seal member located to seal between the valve member and the cavity to prevent the flow of fluid through the cavity between the passageway and the second conduit, and a pressure face on the valve member between the seal member and the second conduit against which the seal member is forced when the pressure in the first conduit is greater than the pressure in the second conduit and against which the pressure in the second conduit acts when the pressure therein is greater than the pressure in the first conduit whereby a force will be exerted on the valve member by the pressure in the conduit urging it toward engagement with the valve seat regardless of which conduit contains the greater pressure; the area of the pressure face being at least equal to the maximum effective area of the valve member against which the pressure in the conduits acts when the valve member is sealingly engaging the seat, and means operable outside the body for moving the valve member away from the seal to open the valve.

8. A valve for controlling the flow of fluid between a first and second fluid conduit comprising, a body having a cavity therein, and an opening connecting the cavity to the second fluid conduit, a valve seat, supported by the body, having a port therethrough connecting the cavity to the first fluid conduit; a valve member reciprocally mounted in the cavity for movement into and out of sealing engagement with the valve seat to control the flow of fluid through the port between the two fluid conduits, resilient means urging the valve element into sealing engagement with the valve seat, a passageway in the body connecting the first fluid conduit to the cavity; a seal member located between the valve member and the cavity to prevent the flow of fluid through the cavity between the fluid conduits, a laterally extending surface on the valve element arranged to engage the seal member and limit its travel toward the valve seat and stop means carried by the body to limit the movement of the seal member away from the valve seat, to allow the fluid in the conduit having the highest pressure to act over the area of the laterally extending surface in the valve element, the area of said surface being equal to or greater than the effective area of the valve element against which the pressure of the fluid in either conduit acts urging the valve member away from the valve seat to thereby prevent the flow of fluid between the fluid conduits regardless of which direction the fluid tends to flow, and means for moving the valve member away from the valve seat to open the valve.

References Cited by the Examiner
UNITED STATES PATENTS

| | | | |
|---|---|---|---|
| 869,755 | 10/1907 | Tretch | 137—608 X |
| 2,247,140 | 6/1941 | Twyman | 137—608 X |
| 2,692,114 | 10/1954 | Fullwood | 251—282 |
| 2,796,230 | 6/1957 | Grove et al. | 251—172 |
| 2,881,793 | 4/1959 | Lee | 251—282 X |
| 2,931,387 | 4/1960 | Fleming | 137—608 |
| 3,102,550 | 9/1963 | Shand et al. | 251—282 X |

M. CARY NELSON, *Primary Examiner.*

S. SCOTT, *Examiner.*